United States Patent
Obrea et al.

(10) Patent No.: US 7,555,467 B2
(45) Date of Patent: Jun. 30, 2009

(54) SYSTEM AND METHOD FOR RELIABLE TRANSFER OF VIRTUAL STAMPS

(75) Inventors: Andre Obrea, Seymour, CT (US); Frederick W. Ryan, Jr., Oxford, CT (US)

(73) Assignee: Pitney Bowes Inc., Stamford, CT (US)

(*) Notice: Subject to any disclaimer, the term of this patent is extended or adjusted under 35 U.S.C. 154(b) by 626 days.

(21) Appl. No.: 11/142,618

(22) Filed: May 31, 2005

(65) Prior Publication Data

US 2006/0259444 A1 Nov. 16, 2006

(51) Int. Cl.
G07B 17/00 (2006.01)
(52) U.S. Cl. .................. 705/401; 705/410; 705/28; 705/404; 235/379; 380/51
(58) Field of Classification Search .............. 380/51; 395/824; 705/401
See application file for complete search history.

(56) References Cited

U.S. PATENT DOCUMENTS

| | | | | |
|---|---|---|---|---|
| 5,444,631 A | * | 8/1995 | Vermesse | 705/404 |
| 5,625,839 A | * | 4/1997 | Kohler et al. | 710/4 |
| 5,715,164 A | * | 2/1998 | Liechti et al. | 705/410 |
| 6,005,945 A | * | 12/1999 | Whitehouse | 380/51 |
| 6,064,993 A | * | 5/2000 | Ryan, Jr. | 705/403 |
| 6,424,954 B1 | * | 7/2002 | Leon | 705/401 |
| 6,438,530 B1 | * | 8/2002 | Heiden et al. | 705/401 |
| 6,746,330 B2 | * | 6/2004 | Cannon | 463/25 |
| 6,757,280 B1 | * | 6/2004 | Wilson, Jr. | 370/389 |
| 7,324,973 B2 | * | 1/2008 | Taylor, III | 705/50 |
| 2003/0074325 A1 | | 4/2003 | Ryan | 705/60 |
| 2003/0220887 A1 | * | 11/2003 | Stickler et al. | 705/401 |
| 2004/0177049 A1 | | 9/2004 | Athens et al. | 705/408 |
| 2004/0177050 A1 | | 9/2004 | Athens et al. | 705/408 |
| 2004/0230503 A1 | * | 11/2004 | Lucas | 705/28 |
| 2006/0006223 A1 | * | 1/2006 | Harris | 235/379 |

FOREIGN PATENT DOCUMENTS

WO 2004/012053 A2 2/2004

OTHER PUBLICATIONS

"Information Based Indicia Program (IBIP) Indicium Specification," United States Postal Service, Jun. 13, 1996.
"Information Based Indicia Program Host System Specification," United States Postal Service, Oct. 9, 1996.

* cited by examiner

*Primary Examiner*—John W Hayes
*Assistant Examiner*—Brian Epstein
(74) *Attorney, Agent, or Firm*—George M. Macdonald; Angelo N. Chaclas

(57) ABSTRACT

The present application describes systems and methods for reliable transfer of information of value such as virtual postage stamps between a remote data center and a local device. An identifier that is unique over at least some time duration is assigned to each virtual postage stamp such that the identifier is associated with a specific index memory location or record storage location in the local virtual stamp-printing device. The local printing device permits only a single use of a virtual stamp using a secure state flag. The transfer protocol provides reliable transfer of virtual stamps between the remote data center and the local printing device that accommodates resend requests, that is not limited to serial transfer and that does not require end-to-end acknowledgements.

16 Claims, 4 Drawing Sheets

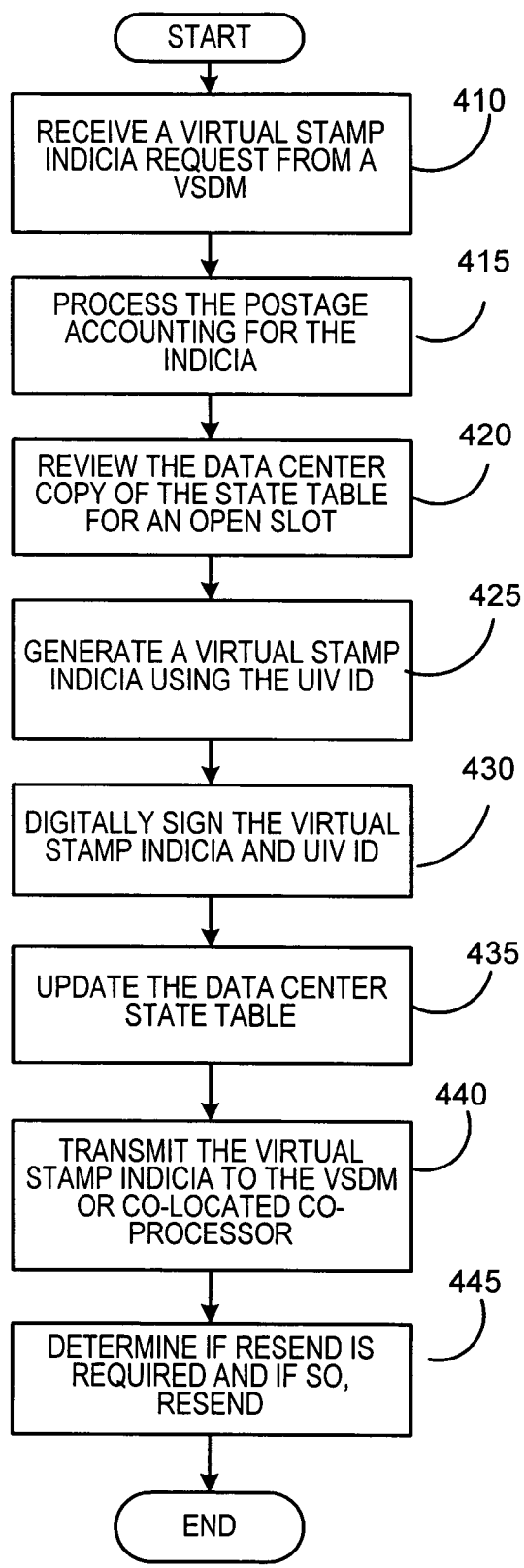
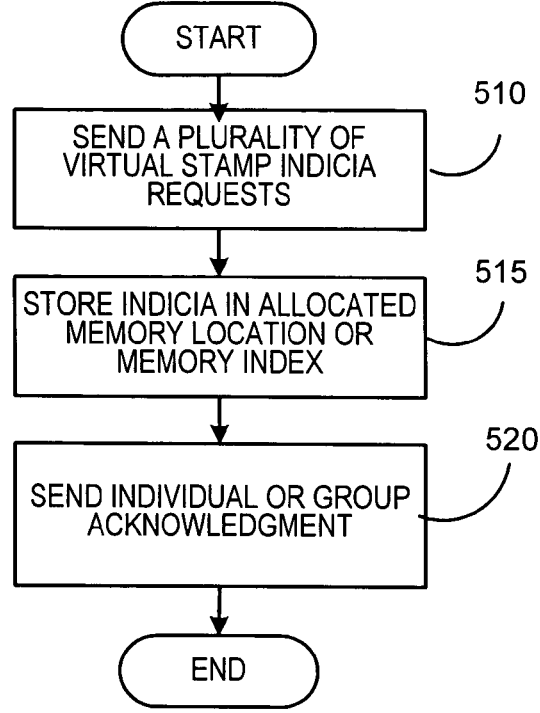
FIG. 4
FIG. 5

SYSTEM AND METHOD FOR RELIABLE TRANSFER OF VIRTUAL STAMPS

CROSS REFERENCE TO RELATED APPLICATIONS

The present application is related to co-pending, commonly owned U.S. patent application Ser. No. 11/142,619 filed herewith, entitled Method To Control The Use of Custom Images, which is incorporated herein by reference in its entirety.

FIELD OF THE INVENTION

The present invention relates to a system and method for reliably transferring information of value and more particularly in certain embodiments to the reliable transfer of postage indicia value tokens from a remote data center that includes a virtual postage meter for dispensing postage indicia tokens to a remote device used for storing and printing such postage indicia value tokens.

BACKGROUND OF THE INVENTION

Mailing machines including postage metering systems are known in the art including the DM SERIES of mailing machines available from Pitney Bowes Inc. of Stamford, Conn. Internet based postage delivery systems and data center services are also available from Pitney Bowes Inc. A postage metering system applies evidence of postage, commonly referred to as postal indicia, to an envelope or other mailpiece (directly or on a label to be applied thereto) and accounts for the value of the postage dispensed.

Postage metering systems are often categorized as closed system meters or open system meters. In a closed system, the system functionality is typically dedicated to postage metering activity and often includes a dedicated printer securely coupled to a Postal Security Device PSD postage vault. In an open system, the printer is typically not dedicated to the metering activity and is often connected to a remote Postal Security Device PSD postage vault or virtual PSD. In the open system defined by the United States Postal Service (USPS) Information Based Indicia Program (IBIP), indicia printed by the non-dedicated printer are made secure by including elements o addressee information in the encrypted evidence of postage printed on the mailpiece for subsequent verification.

Digital printing postage meters have removed the need for the physical inspection that was required with analog systems by cryptographically securing the link between the accounting and printing mechanisms. In essence, digital printing postage meters create a secure point-to-point communication link between the accounting unit and printhead. In such digital closed systems, the dedicated printer and the metering (accounting) device may be located in the same device and/or at the same location when placed in operation. Alternatively, the dedicated printer may be located in a first location (i.e., the local location where indicia are to be printed), and the metering (accounting) device may be located in a remote location, such as a provider's data center. In the latter situation, it is still necessary for the dedicated printer to be a secure device having cryptographic capabilities so that postage printing information, such as an indicium, received from the metering (accounting) device, and the metering (accounting) device itself, can be authenticated.

A method and system for dispensing virtual stamps is described in U.S. Patent Application Publication US 2003/0074325 A1 entitled Method and System for dispensing Virtual Stamps by Ryan that was published on Apr. 17, 2003 (the Ryan '325 application) and that is incorporated herein by reference. A Virtual Stamp Dispensing Metering VSDM system is described wherein indicia of varying values are calculated at a remote data center and downloaded to a mailing machine. The VSDM system stores the indicia and dispenses the indicia as needed. The system includes a secure storage unit and a state indicator that is used to prevent fraudulent reuse of the virtual stamps. A status field for each indicium record, i.e., Issued or Unused, is maintained to indicate whether an indicium has been issued (printed) or not. Accordingly, the VSDM system does not require sophisticated cryptographic processing because the indicia are signed at the remote data center. A network communication system may be used to efficiently download stamp information from the remote data center (with Virtual PSD) to the stamp dispensing metering system.

Many networks including the traditional Public switched Telephone Network have been designed that provide a dedicated path or circuit from source to destination for the duration of message transfer. The message is delivered along the same path in order and in its entirety. However, many communications networks such as the Internet have been designed that provide connectionless packet switched networks that usually send portions of a message or packet along different routes through the core of the network from the source node at the edge of the network to the destination node at the edge of the network. A packet switched network is sometimes operated in a connection-oriented reliable service manner such that it guarantees that the packets of the message are delivered in order and the message is delivered in its entirety. In other configurations such as media streaming applications, networks are operated as a connectionless unreliable service such that some packets may not be properly transferred and are not resent.

A network communications protocol defines the control and data message format and order. Information exchanges between computers may fail for a variety of reasons. The most common remedy is to attempt to retry, or resend the message. The exchange of information between a postage evidencing device and a data center may fail resulting in loss of funds or valuable information. For example, a request to purchase postage may not be completed during its transmission over the Internet (e.g., no explicit acknowledgement is received). In such a situation, the sender does not know if the original request was received by the data center or not. As a result, the same request may be resent. If the data center did receive the initial request and the failure was due to an acknowledgement not received by the sender (on time), then the data center may assume that two distinct purchase orders where issued by the same customer, in which case the customer is charged twice.

Similarly, if the transmission of the fulfillment message from the data center to the customer were interrupted, the data center would not receive an explicit acknowledgement from the customer. The data center might then resend the message. In such a situation, the customer would receive twice the value that he paid for. In many cases, the solution used to solve this problem is to require an acknowledgement for each transaction before declaring it complete. However, in this case, depending on the scenario, either the customer of the data center may lose funds due to lack of trust (requiring an acknowledgement to complete the transaction). Additionally, such systems typically require end-to-end acknowledgements and serial transfer of messages of information of value. Systems that implement complex safeguards against lost messages in most cases have cumbersome user interfaces which make them un-appealing to the average user.

Accordingly, there is a need for systems and methods for reliable transfer of messages of information of value between a remote data center and a local device that accommodate resend requests, that are not limited to serial transfer and that are not limited to end-to-end acknowledgements.

SUMMARY OF THE INVENTION

The present application describes illustrative embodiments of an invention relating to a system and method for reliable transfer of information of value between a remote data center and a local device. In an illustrative embodiment, unique identifier ID is associated with a Unit of Information of Value UIV such as postage indicia. That identifier is associated with a specific unique index memory location or record storage location and the local device is capable of enforcing the storage of each UIV to a specific memory location. At least the local device is configured to monitor and enforce the number of uses of a UIV such as a single use in the case of a postage indicia. In one embodiment, a UIV usage state indicator is stored in secure memory to maintain a use state flag to monitor and enforce the usage policy.

If the communication channel is interrupted (or even attacked by a replay attack) the remote data center may resend the UIV because the remote device will enforce the use policy for the specific UIV at the specific local device memory location. In at least one embodiment, the remote data sender does not require an end-to-end acknowledgement but rather relies on an acknowledgement from an intermediary computer that may be connected to the remote device. Furthermore, the remote data center may send a batch of UIVs and receive a batch acknowledgement or a selective explicit resend based upon the UIV ID. Accordingly, the UIV message transfer may be started and processed in parallel and may complete in any order. In a further illustrative embodiment, a digital signature of the UIV combined with the UIV ID is provided to prevent an attack on the UIV ID.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 4 is a flowchart illustrating the process flow for processing a request for a UIV message at a remote data center according to an illustrative embodiment of the present application.

FIG. 5 is a flowchart illustrating the process flow for requesting virtual stamps (UIV) from a local device or intermediary device according to an illustrative embodiment of the present application.

DESCRIPTION OF THE PREFERRED EMBODIMENTS

The illustrative embodiments of the present application describe systems and methods for reliably transferring virtual stamps that accommodate resent requests, that are not limited to serial transfer and that are not limited to end-to-end acknowledgements. A representative method reduces the risk associated with transferring information of value between a data center and a hardware device by assigning unique identifiers to the information of value that are derived from the storage location used in the device. The illustrative embodiments describe a postage evidencing system for transferring virtual stamp indicia and may incorporate the methods and systems for dispensing virtual stamps described in the Ryan '325 application and the related patent application described above.

Multiple transfers of virtual stamp indicia or associated UIVs such as graphic downloads and requests such as refund requests may be executed in any order. In addition, transactions such as virtual stamp requests, graphic downloads, and refund requests may be stored on an intermediate device such as a personal computer that can be connected to the local device. Accordingly, the transactions may be replayed or repeated locally from the intermediate personal computer to the local device even after the connection session to the remote data center is terminated. As a result, it is possible to successfully complete failed or incomplete transactions when one of the two endpoints of the transaction is no longer connected. Furthermore, transactions never have to be rolled back or cancelled due to an ambiguous transmission error thereby simplifying the synchronization of transaction state between the two endpoints and also eliminating potential security loopholes.

Figure 1:
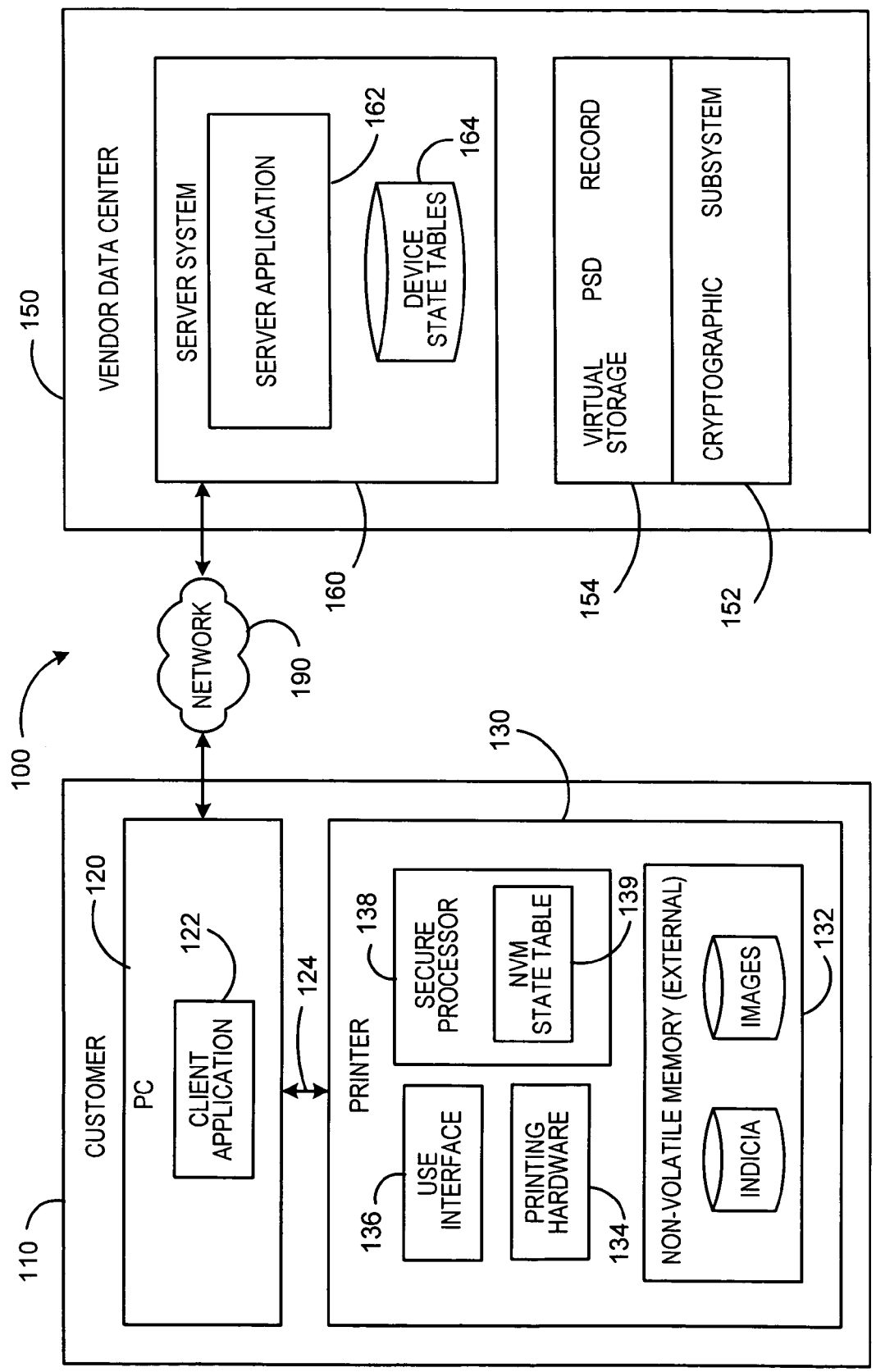
FIG. 1 is a block diagram of one illustrative embodiment of a postage evidencing system according to the present application.

Referring to FIG. 1, an illustrative postage evidencing system according to the present application is described. FIG. 1 shows portions of a virtual stamp dispensing meter system 100. A virtual stamp, as used herein, provides evidence of postage paid using a label that is similar to a conventional adhesive stamp. The system 100 includes an information of value processing device such as a Virtual Stamp Dispensing Metering VSDM system (meter) 130 that includes a VSDM 130 and an associated co-located co-processor personal computer 120 that communicates with a Vendor Data Center 150 via communication link 190. The communication link 190 comprises the Internet, but could alternatively utilize a telephone connection via a Public Switched Telephone Network (PSTN) or a network connection via a Local Area Network (LAN).

VSDM 130 could be either a stand-alone postage meter, or alternatively integrated into a larger piece of equipment such as, for example, a mailing machine. In the system shown in FIG. 1, the VSDM 130 is attached to a personal computer 120 via communications channel 124 that is a USB connection. Alternative communications channels such as a wireless channel may be used and in an alternative configuration, the VSDM 130 could communicate directly with data center 150. The VSDM 130 or the client application 122 is used to originate requests for UIVs to be fulfilled by a data center. In this configuration, the request is communicated to the data center via the attached PC. After the data center receives and processes the request, a reply (fulfillment) is created and communicated to the device, again via the PC. Note that the presence of the PC is optional, and more than one intermediate computer such as the PC may be present in the system.

Data center 150 includes a suitable processing system having a computing device such as a server computer 160 and one or more memory components for data storage 164. The data center 150 also includes a Virtual Indicia system including a cryptographic subsystem 152 and a virtual PSD record storage system 154 that are in operative communications with server 160. The server system includes a server application 162 for carrying out the functions described herein and a device state table storage system 164 for storing a copy of the indicia use state table information from each of the VSDMs 130 (the server copy of the state tables may not always reflect the most current transaction states at a particular point in time, for example, when a VSDM prints indicia offline).

The remote data center 150 is in electronic communication with one or more local UIV processing systems 110 (only one processing system is shown in FIG. 1 for purposes of clarity of description) over any suitable communication network 190 such as the Internet. Each UIV processing system 110 may include an intermediary processor 120 such as a personal computer, a personal data assistant, a cell phone, or the like. In the illustrative example, the data center 150 is maintained and operated by a postage indicia provider such as an authorized postage meter manufacturer or some other authorized postal agency. The personal computer 120 includes a client application 122 for performing the intermediate processor functions described herein. In an alternative embodiment, the local UIV processing system includes a personal computer with an interface to a secure smart card having a NVM state table used for processing other UIVs such as music files, video files, multimedia content UIVs or event tickets.

As seen in FIG. 1, VSDM 130 includes a user interface 136, printing hardware 134, nonvolatile memory 132 and a secure processor 138 including a non-volatile memory NVM state table 139. In alternatives, certain elements such as the user interface are not necessary. Secure processor 138 includes a H8S2218 processor with NVM program and data memory and RAM, but could alternatively utilize a processor included in an ASIC, a microprocessor, a microcontroller, or unsecured processor connected to a secure NVM memory state table. As an alternative, a physically secure processor may be used such as an IBUTTON available from Dallas Semiconductor. The printing hardware 134 comprises a direct contact thermal printing subsystem and associated controller that enables the printing of virtual stamps including USPS IBIP bar codes and other near photo quality gray scale images, but could alternatively utilize other digital printing technologies such as ribbon impact or ink jet printing subsystems. The printer controller functionality may be included in the secure processor 138.

The NVM state table 139 comprises EEPROM memory in the secure processor 138 that is used to securely store the use status state for each UIV record location to enforce a use policy. Alternatively, the state table could include internal and/or external storage including battery backed RAM, EEPROM, magnetic or physical media and the like, alone or in combination. Similarly, NVM 132 for storage of virtual stamp indicia records and images 132 comprises EEPROM memory, but alternatively could include the memory types mentioned above. The processing routines described herein may alternatively be implemented in any of a variety of forms such as, without limitation, software, firmware, and the like, and may include one or more subroutines, processes, procedures, function calls, objects, methods or the like, alone or in combination. In an alternative, the entire UIV record storage system including the individual virtual stamp indicia record storage locations are stored in secure memory.

In the embodiment shown in FIG. 1, meter 130 does not include a postal security device (PSD), but instead prints virtual stamp indicia that were previously dispensed by an approved PSD associated with data center 150 for specific postage denominations. It will be appreciated, however, that other alternatives are possible, including embodiments where a PSD is located at the customer site. In operation, a user sends a request to purchase postage from the meter 130 or the co-located personal computer 120 to the data center 150. Many types of requests are possible, but an example is shown with reference to TABLE 1. The user requests two $0.23 stamps and 4 $0.37 stamps. In an alternative, the user could select from predefined menu choices such as the equivalent of a 20 stamp booklet or a 100 stamp roll. The data center 150 may require a pin or use other authentication methods including biometric authentication.

TABLE 1

| Device ID | Index | Postage Amount | Expiration Date | State Table Status | Encrypted Indicium Data | SIGNATURE |
|---|---|---|---|---|---|---|
| 1A1B2 | 1 | $0.23 | Jun. 1, 2005 | Issued | ************************** | 1234567890ABCDE |
| 1A1B2 | 2 | $0.23 | Jun. 1, 2005 | Unused | ************************** | 234567890ABCDEF |
| 1A1B2 | 3 | $0.37 | Jun. 1, 2005 | Issued | ************************** | 34567890ABCDEF1 |
| 1A1B2 | 4 | $0.37 | Jun. 1, 2005 | Issued | ************************** | 4567890ABCDEF12 |
| 1A1B2 | 5 | $0.37 | Jun. 1, 2005 | Issued | ************************** | 567890ABCDEF123 |
| 1A1B2 | 6 | $0.37 | Jun. 1, 2005 | Unused | ************************** | 67890ABCDEF1234 |

In response, the data center 150 generates an appropriate number of virtual stamp postage data records (one for each requested indicium) and securely transmits them (e.g., using an SSL connection) to the VSDM meter 130 or intermediary processor 120 as described herein. The data center 150 first interrogates the device state table 164 to determine which memory locations are available and then assigns them in order. Alternatively, the data center 150 may determine the next available location based upon its copy of the state table contained in device state table database 164. Here, the first six locations are available and the unique ID for each of the first six virtual stamps is that device ID followed by the memory location value 1 through 6 respectively. In an alternative for added security, the meter 130 must suggest the correct next available memory location for the transaction to be processed. TABLE 1 below illustrates one method for storing the indicia downloaded from data center 150 in NVM 132. The expiration date indicates the last day on which the indicium may be issued, i.e., printed.

A status for each indicium, i.e., 0 or 1, Issued or Unused, is maintained in the secure NVM state table 139 to indicate whether or not an indicium has been issued. Alternatively, the status may be maintained by deleting indicia as they are issued. Additional status levels can also be provided. The indicium barcode data is stored in an encrypted form to protect against an attacker simply reading data out of the NVM 24 and using a standard printer to print indicia. Each record also includes a digital signature that includes the virtual stamp data and the Device ID and the memory location index value used to prevent modification and to enforce the unique storage location requirement. Any modification to any of the fields such as amount, status, and/or memory location of the virtual stamp record would render the digital signature invalid. Accordingly, the secure processor may verify the signature by checking that the signature is valid before operating the printer or a request for refund. Accordingly, the secure processor may enforce the unique memory location requirement for each particular virtual stamp record.

Preferably, the postage data records are encrypted using a secret key that is assigned to the particular meter printer 130 in question and are digitally signed by the data center 150 before being sent to the meter 130. Meter 130 performs the postage printing function only and the postage dispensing and accounting functions are performed by data center 150. In an alternative, the virtual stamp data records are not encrypted but are digitally signed. The meter 130 then enforces a policy allowing printing of only properly signed indicium associated with that printer ID which is securely stored in the meter 130.

As can be appreciated, once the meter 130 syncs with the data center 150, the data center state table record 164 for a particular meter can be updated. As can be appreciated, the state table memory allocated at the data center for each device can be larger than that available on the specific device. Accordingly, the data center state table storage may maintain historical sets of prior device state tables. While the unique UIV ID combination of device ID and index cannot be reused, the used postage stamp locations could be assigned a new index and reset for reuse so that a new UIV ID is assigned. In an alternative, the data center waits until it receives information form the postal authority mail processing systems that a particular virtual stamp has been inducted and/or delivered to its final destination or intermediate destination before assigning a location a new index and therefore a new unique ID for reuse. In another alternative, the stamp index locations may not be changed for reuse and the device is reconditioned by providing a new device ID in order to reset the stamp index storage locations for reuse.

As described above, postage evidencing system 130 enables a user to print virtual stamp indicia images (that may also include the user's custom images), on a mailpiece or a label to be applied to a mailpiece. The following figures describe processes for using the system of FIG. 1 and communications protocols that provides reliable transfer of virtual stamps between the remote data center and the local printing device that accommodates resend requests, that is not limited to serial transfer and that does not require end-to-end acknowledgements. A unique ID is assigned to each Unit of Information of Value (UIV) such as a virtual postage stamp, song, video, picture or ticket which preferably consists of the unique hardware device ID plus the location where the UIV will be stored in the device. In an alternative, another unique identifying attribute such as an Ethernet address is utilized as the device ID. The secure processor 138 includes secure program memory that cannot be changed by the user that enforces the storage of each UIV to a specific location (the device thereby provides some level of security). In an alternative provided for added security, the number of available memory locations or state table index locations may be limited for a particular meter 130. The data center 150 and the meter 130 both monitor and enforce the use policy that in this example is a single use of the virtual stamp and associated Unique ID described above before the expiration date.

The illustrative transmission protocols described provide simplified error recovery. Because the virtual stamp UIV can only be loaded into one particular meter and at only one particular memory location in that meter, the data center 150 may safely retransmit the same UIV delivery message an unlimited (within reason) number of times to perform recovery of interrupted communications regardless of the reason (technical failure or even an attempt to defraud the system). This is possible because the recipient of each message can rely on the Unique ID defined above to distinguish a new request (reply) from a replay of a message already received. In another embodiment, the data center 150 may further rely upon the use of an expiration date and a policy that storage locations are never reused for added security. Furthermore, the illustrative protocols allow the storage of UIV messages on intermediate nodes between the origin at the data center and the destination at the meter. For example, UIV messages received from the data center 150 can be stored on the PC 120 and download to the meter 130 at a later time, when the meter is connected to the PC. The intermediate PC may provide any required acknowledgement and then end the communications session with the data center 150 and then later transfer the UIV messages to the meter 130. Accordingly, end-to-end acknowledgements are not required.

The UIV message transfer transactions can be started and/or completed irrespective of the order of the Unique ID used. As a result, multiple transactions can be started and processed in parallel and they may complete in any order and possibly out of sequence. It should be understood that postage evidencing system 100 is just one particular embodiment of a mail processing system in which the present invention may be implemented, and that the invention as described herein may also be implemented in other open or closed mail processing systems such as those described above.

Figure 2:
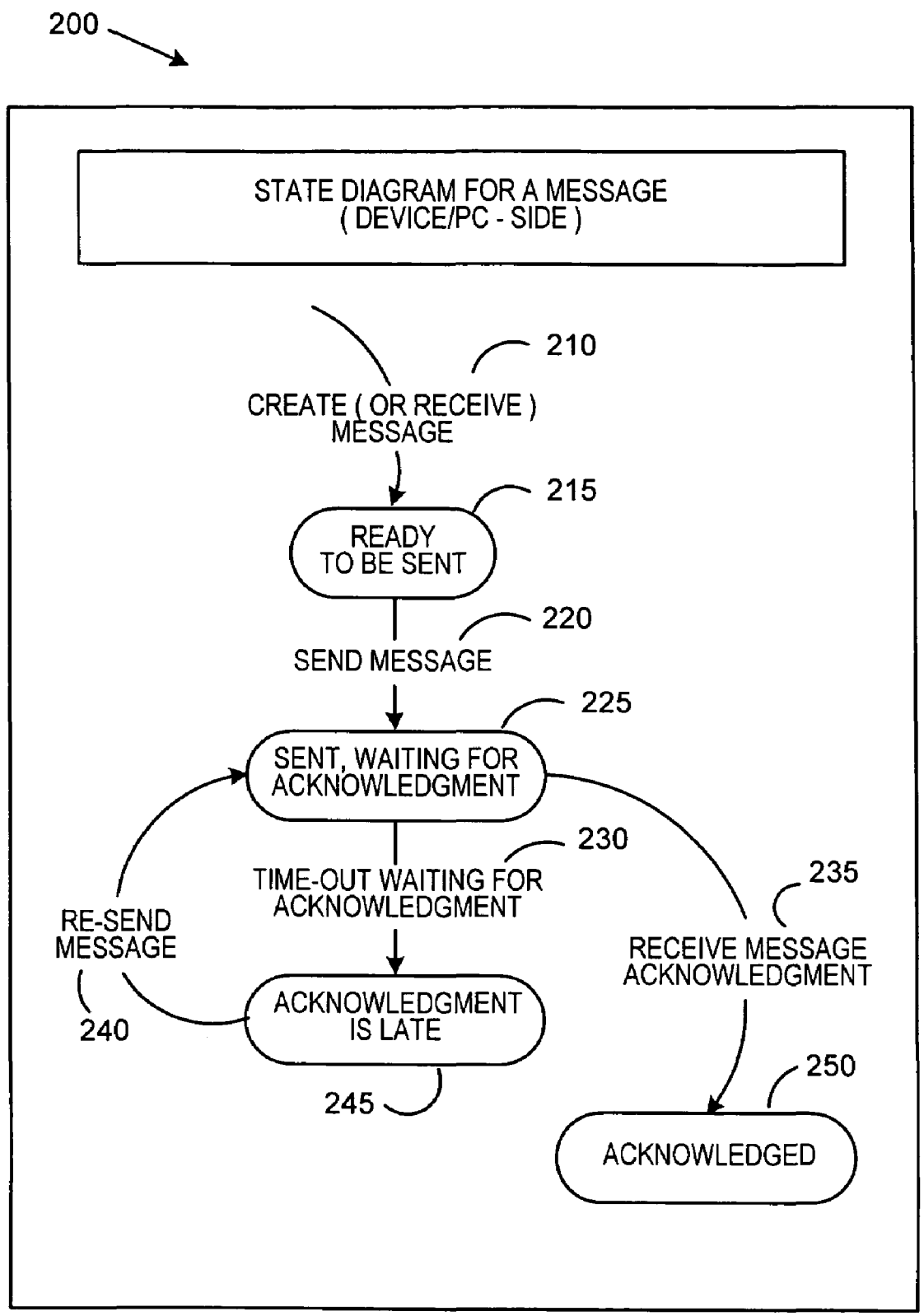
FIG. 2 is a state diagram for sending a message according to an illustrative embodiment of the present application.

Referring to FIG. 2, a flowchart illustrating the state diagram 200 for sending a message that may contain a UIV request from a local device according to an illustrative embodiment of the present application is described. The message may contain a UIV or only an acknowledgement of a previous message. In activity 210, the local meter device or co-located PC creates a message to be sent such as a signed request for virtual postage stamps or receives a message to be forwarded. In state 215, the device state is that the message is ready to be sent and in activity 220, the message is sent. In state 225, the device has sent a message and is waiting for a positive acknowledgement. If the device receives a positive acknowledgement, it exits state 225 along path 235 and enters the acknowledged state 250. If the device instead times out waiting for the acknowledgement, it exits state 225 along path 230 to the acknowledgement is late message which then triggers the re-send message path 240 that reenters state 225. In this example, the signed request for virtual postage stamps includes the next available memory location. Accordingly, the device can freely resend the request without concern that the data center will consider the resend to be a distinct request rather than a resend of the original request because the data center can ignore duplicate messages with the same next memory address. In an alternative, the meter device 130 assigns the UIV ID for each virtual stamp requested and they may be out of order. In such a case, the data center would process only one request per unique UIV ID. From the perspective of the meter device 130, a duplicate UIV message is discarded because the UIV that previously downloaded could have been used in the period of time between the two duplicate UIV messages.

Figure 3:
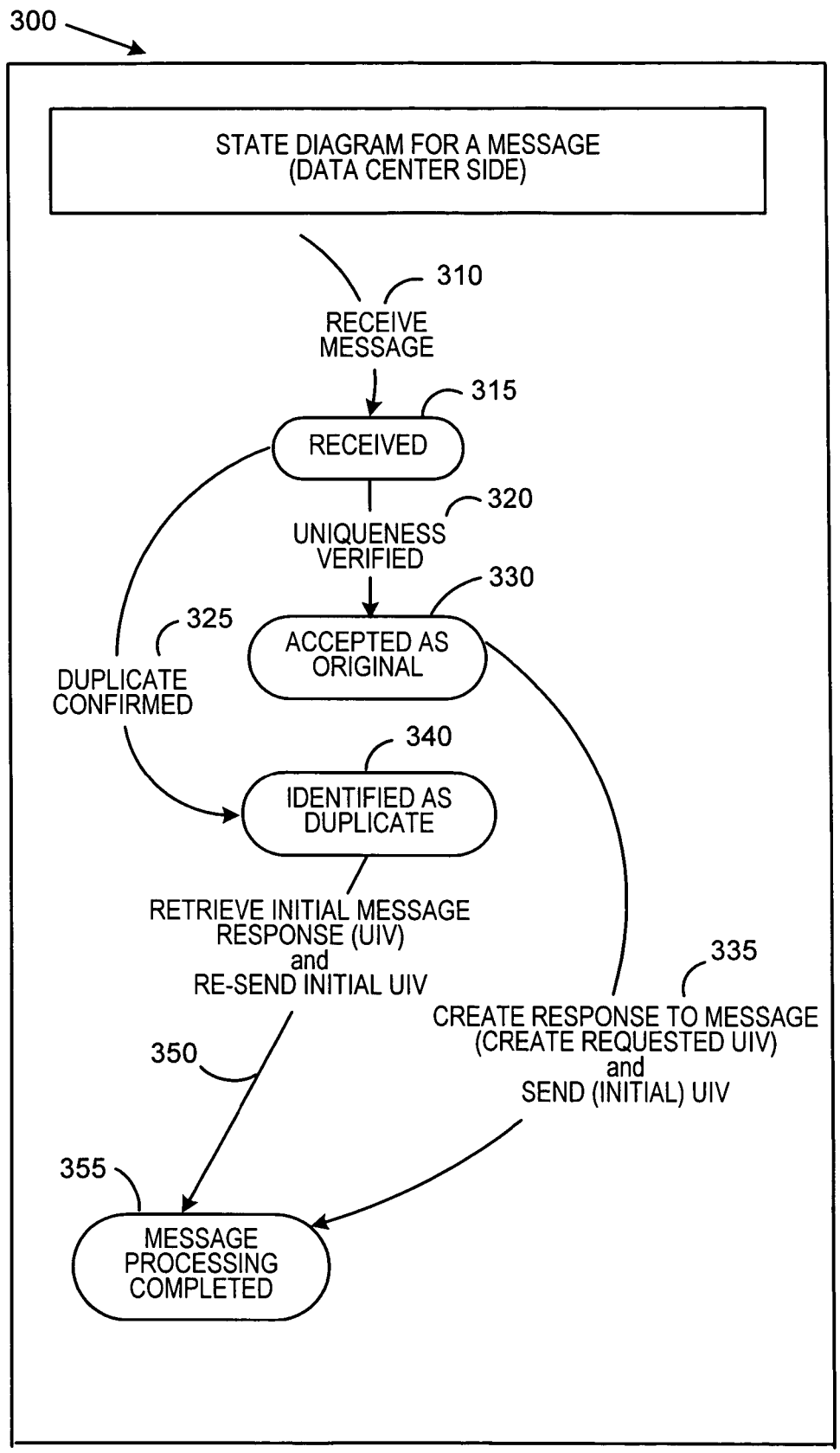
FIG. 3 is a state diagram for processing a UIV message from a remote data center according to an illustrative embodiment of the present application.

Referring to FIG. 3, a flowchart illustrating the state diagram 300 for processing a message from a remote data center according to an illustrative embodiment of the present application. The message may contain a UIV or only an acknowledgement of a previous message. In activity 310, the data center receives a message such as a UIV request message and enters the received state 315. The system exits the received state 315 if the request is unique along path 320 to state 330 for the accepted-as-original message state. Otherwise, if a duplicate is confirmed, the system exits state 315 along path 325 to the identified as duplicate state 340. The initial UIV response to the request (e.g., a number of UIV downloads) is constructed in 335 using records from database 154. Alternatively, responses could be stored in a database and simply retrieved in the case of a duplicate request. In activity 350, the system resends the initial response to the request.

If the message is accepted in state 330, the system exits that state along the create response message and send UIV path 335. In an alternative, the system also checks that the UIV message request included the correct next available memory location before accepting the message. In such a case, receiving the wrong next available memory location in the message may be used to initiate a potential fraud message for further action such as account suspension or inactivation. In yet another alternative, additional security systems and checks are implemented including a counter to limit the number of re-sends. After processing the request (see FIG. 4), the system constructs a UIV response and sends the UIV response. It should be noted that the responses to an initial request and duplicate request are the same, simplifying the logic required to handle the responses. In all cases, the message processing is completed in step 355.

Referring to FIG. 4, an illustrative process flow for processing a request for a UIV message at a remote data center according to an illustrative embodiment of the present application is described. In step 410, the data center receives a virtual stamp indicia request from a VSDM or a co-located processor that may include the request as shown in TABLE 1. In step 415, the data center processes the postage accounting and debits the postage account for the amount of postage requested. When processing requests for generic UIVs including songs and the like, a traditional payment process is used. In step 420, the data center interrogates the data center copy of the state table to determine the next available memory location for UIV storage. In an alternative, the virtual stamp indicia request must include the correct identification of the next available memory location in order for the processing to continue. In step 425, the data center generates the appropriate virtual stamp indicia using the UIV ID determined by the device ID and the memory location index identifier such as shown in TABLE 1.

In step 430, the data center digitally signs the virtual stamp along with the UIV ID using a private key which has a corresponding public key that can already be resident in the meter 130 or the PC 120. Alternatively, digital signature does not include the UIV ID and the public key may be obtained using traditional means. In step 435, the data center updates the data center state table to indicate that those UIVs were sent to the meter. In step 440, the data center transmits the UIVs to the meter or co-located processor. The data center does not need to wait for an acknowledgment for one UIV before sending another. Additionally, the data center will accept a single or group acknowledgement from with the end system meter or the intermediary processor. In step 445, the data center determines if a resend is required using a timeout or an explicit no acknowledgment message and if so, it resends the UIVs required.

Referring to FIG. 5, an illustrative process flow for sending a UIV request message from a local device or intermediary device according to an illustrative embodiment of the present application is described. In one embodiment shown with reference to FIG. 1, an intermediary communications device 120 is used to request and store UIVs that must be used with the co-located system such as meter 130. In step 510, the PC 120 sends a plurality of UIV requests such as a request for the six virtual stamps shown in TABLE 1. The request may originate from the meter 130 or the PC 120. The PC 120 then stores the indicia in step 515. In an alternative, the meter 130 stores the indicia in the allocated memory locations. The PC then sends individual or group acknowledgements to the data center in step 520. Accordingly, the PC 120 may end the communication session with the data center 150 and may then later send the UIVs to the meter 130.

In one embodiment, the system waits a period of time such as one minute to receive UIV information messages before acknowledging any of the UIVs. The system may also provide group acknowledgements if the UIVs are sent in sequential memory order, the positive acknowledgement can be used to signify receipt of UIVs through that memory location number.

According to yet a further aspect of the invention, the data center may push UIVs to the local device such as to provide a promotion with free postage, etc. Since transactions can be executed in any order, the data center can prepare a message for a hardware device and download the message to the device during the next connection. This allows a UIV (e.g., postage, images, songs) to be prepared prior to connection by the hardware device and without the user's knowledge. The message can then be pushed to the device during the connection enabling the data center to reward a loyal customer with additional UIV's or allow a customer to try a UIV as part of a promotion.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. It should be understood that the invention as claimed may be implemented in a number of different mail processing systems, including various known open and closed systems. In addition, the concepts of the present invention are not limited to application in the area of postal indicia printing, but may also be used in connection with the reliable transfer of any type of indication of value in systems, such as, for example, ticketing and digital content delivery rights management. Accordingly, the invention is not to be considered as limited by the foregoing description but is only limited by the scope of the appended claims.

The invention claimed is:

1. A method of distributing a Unit of Information of Value (UIV) from a remote data center having a processor to an information of value processing device having a unique ID and a plurality of UIV memory locations, each UIV memory location having a memory slot identifier at a user location comprising:

receiving a UIV request at the remote data center processor, wherein the UIV request includes an available memory slot identifier;

obtaining an available memory slot identifier from a data center UIV state table associated with the information of value processing device using the processor;

determining a UIV ID including the unique device ID and the available memory slot identifier using the processor;

generating a unique UIV in response to the UIV request including UIV data, the UIV ID and a digital signature of at least the UIV data and the UIV ID using the processor, assigning an initial use state to the unique UIV using the processor;

sending the unique UIV in response to the UIV request without determining if the UIV request is a duplicate request using the processor;

verifying that the UIV request corresponds to an expected memory slot identifier using the processor; and;

updating the data center UIV state table associated with the unique UIV to reflect the initial use state using the processor.

2. The method of claim 1, wherein the unique UIV is sent to the information of value processing device.

3. The method of claim 1, wherein, the unique UIV is sent to an intermediate processor co-located with the information of value processing device.

4. The method of claim 1, further comprising, determining if an acknowledgement associated with the unique ID has been received within a period of time; and if the acknowledgement has not been received within the period of time, then re-sending the unique UIV.

5. The method of claim 1, wherein, the UIV comprises a virtual postage stamp; and the information of value processing device comprises a Virtual Stamp Dispensing Meter (VSDM).

6. The method of claim 1, wherein, the UIV request is received from the information of value processing device.

7. The method of claim 1, wherein, the UIV request is received from an intermediate processor co-located with the information of value processing device.

8. The method of claim 1, wherein, the UIV memory locations comprise memory index pointer locations.

9. The method of claim 1, further comprising, processing payment for the UIV request.

10. The method of claim 1, further comprising, pre-processing a promotional UIV associated with the information of value processing device, and;

providing the promotional UIV to the user after receiving the UIV request.

11. The method of claim 10, wherein, the pre-processing includes assigning the next available UIV ID to the promotional UIV.

12. The method of claim 1, further comprising, receiving a second copy of the UIV request at the remote data center; and;

then re-sending the unique UIV, without determining whether a UIV acknowledgement was received.

13. A virtual stamp dispensing system comprising:

a user interface subsystem;

a printer configured to print a plurality of virtual stamps each corresponding to a single use virtual stamp postage data record, wherein the virtual stamp postage data record includes an indicium data field, an ID field, and a signature field, and wherein said ID field includes a unique virtual stamp dispensing system identifier, a memory index identifier and a state field, and wherein the signature field includes a digital signature of at least the indicium data field and the ID field;

a communication subsystem;

a non-volatile memory having a plurality of memory locations, each configured to store one of the plurality of the indicium data fields;

a secure non-volatile memory having a plurality of physical memory locations, each uniquely identified by the respective memory index identifier and configured to store one of the plurality of the state fields, wherein each of the plurality of secure non-volatile physical memory locations is associated one-to-one with a respective non-volatile memory locations;

a processor coupled to the user interface subsystem, the printer, the communication subsystem, the non-volatile memory and the secure non-volatile memory, wherein the processor includes is configured to store a particular virtual stamp data record only in the secure non-volatile physical memory location uniquely identified in the ID field and the associated non-volatile memory location by utilizing the signature field to enforce the storage configuration, and wherein the processor is configured to update the state field associated with a particular virtual stamp postage data record after the associated virtual stamp is printed.

14. The system of claim 13, wherein the communication subsystem is configured to communicate with a collocated processor, wherein the collocated processor communicates with a remote data center that provides the virtual stamp postage data records.

15. The system of claim 13, wherein, the virtual stamp postal data record includes a postage value field.

16. The system of claim 13, wherein, the processor is physically secure.

* * * * *